Dec. 13, 1966 — R. C. KELLER ETAL — 3,290,955
TRANSMISSION
Filed Jan. 15, 1964 — 3 Sheets-Sheet 1

INVENTORS
Robert C. Keller &
BY John F. Weber
ATTORNEY

INVENTORS
Robert C. Keller &
BY John F. Weber

ATTORNEY

Dec. 13, 1966 R. C. KELLER ETAL 3,290,955
TRANSMISSION
Filed Jan. 15, 1964 3 Sheets-Sheet 3

INVENTORS
Robert C. Keller &
BY John F. Weber

A. M. Leiter
ATTORNEY

United States Patent Office 3,290,955
Patented Dec. 13, 1966

3,290,955
TRANSMISSION
Robert C. Keller, Birmingham, and John F. Weber, Roseville, Mich., assignors to General Motors Corporation, Detroit, Mich., a corporation of Delaware
Filed Jan. 15, 1964, Ser. No. 337,932
9 Claims. (Cl. 74—335)

This invention relates to controls for transmissions for vehicles, and particularly to the heavier duty type transmissions such as are used in trucks and commercial vehicles.

In such transmissions, it is usual to provide four forward speed positions, as well as reverse position. Quite commonly in transmissions of this type, there are two control shafts located in the control housing on top of the transmission, one for controlling the position of the gear selecting mechanism and the other the position of the gear shifting mechanism. Since, because of the heavier duty, such transmissions are built to endure, the controls for shifting the transmission into the various speed positions must also be of heavier construction than is the case with the usual passenger vehicle transmission.

Because of the fact that there are two control shafts, and the fact that they must be of heavier construction, this tends to make the control housing in which they are located larger, particularly if the control shafts are located one above the other, with the result that the control housing projects a considerable distance above the top of the transmission, and thereabove the floor of the vehicle, which is undesirable.

It is therefore an object of this invention to arrange the control shafts of the transmission so that the housing in which they are located may be made of minimum height, and therefore will project as little as possible above the top of the transmission, and consequently will not take up as much room in the cab of the vehicle. This is accomplished by locating one of the control shafts inside of the other so that it is concentric therewith. This results in the control shafts taking up less space than is the case where they are located one above the other, or beside each other, and therefore the control housing may be made of considerably less height than would otherwise be the case.

Further objects of the invention will be apparent upon reference to the following description and accompanying drawings in which.

Figure 1:
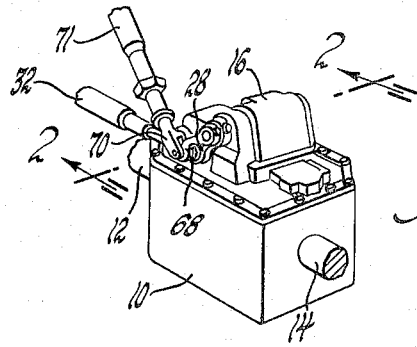
FIGURE 1 is a perspective view of the transmission with which our improved control is associated, showing the selector and shift control rods connected thereto.

In FIGURE 1, the transmission casing 10 is shown removed from the vehicle in which it is to be used, 12 is the drive shaft supplying power to the transmission and 14 is the driven shaft leading to the axle or other element to which power is to be supplied.

Figure 2:
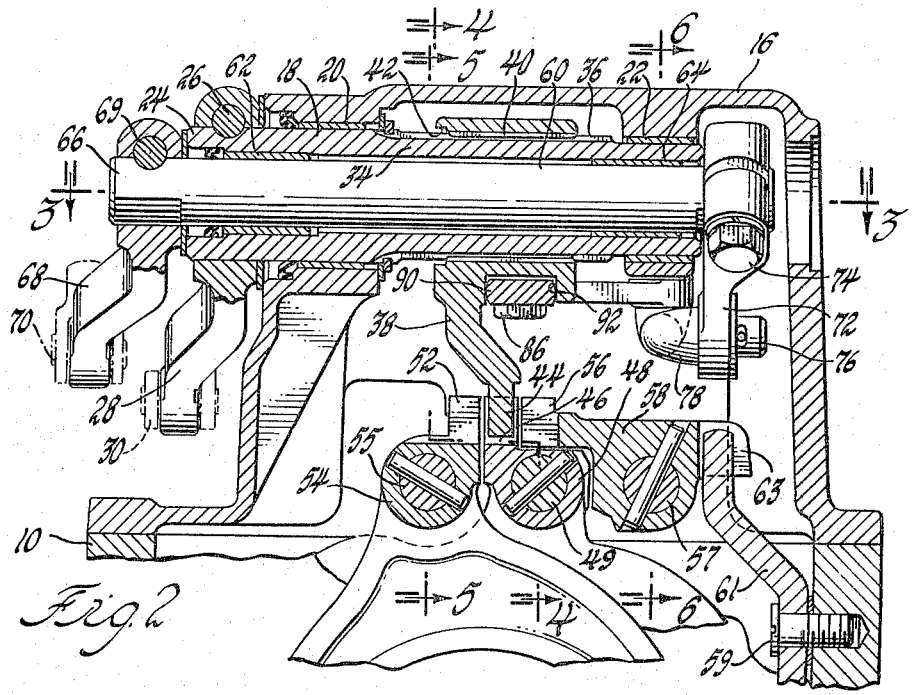
FIGURE 2 is a vertical sectional view through the control mechanism, taken on the line 2—2 of FIGURE 1.

Secured to the top of the transmission casing 10 is a control housing 16 within which our improved control mechanism is located. Referring to FIGURE 2, 18 is a tubular shifter shaft which is mounted in bearings 20 and 22 supported in the housing 16, and the left hand end 24 of the shaft 18 extends outside the housing. Connected to the end 24 of the shaft 18 by means of a clamp bolt 26 is a lever 28 to the outer end of which a yoke 30 is secured, the yoke being connected to the end of a shifter rod 32 which extends upwardly to the shift lever (not shown) which is actuated by the lever located adjacent the driver's seat in the vehicle.

The exterior surface of the central portion 34 of the tubular shifter shaft 18 is provided with splines 36, and a shift and select inner lever 38 having correspondingly shaped splines 40 formed in a bore 42 therein is slidingly mounted upon the central portion of the shaft 18. The lower end 44 of the lever 38 is shown in FIGURE 2 as being positioned in a slot 46 in a shifter yoke 48 which is supported on a shifter rod 49. The yoke 48 controls the engagement of the first or second speed gear train of the transmission, the gearing of which may be of the type shown in the patent to Plexico 2,428,892, and hence need not be described in detail. The end 44 of the lever 38 is adapted to be moved, by mechanism to be described hereafter, into position either in slot 52 in a shifter yoke 54 supported on a shifter rod 55, the yoke 54 controlling the engagement of the third or fourth speed gear train of the transmission, or alternately into position in a slot 56 in a shifter yoke 58 which controls the engagement of the reverse speed gear train, and which is supported on a shifter rod 57. Pivotally supported on the inside of the wall of the transmission casing 10 by a screw 59 is a reverse gear actuating lever 61, the upper end of which extends into a slot 63 in the shifter yoke 58.

The mechanism which is adapted to move the lever 38 into engagement with the shifter yokes 48, 54 or 58 will now be described. 60 is a selector shaft which is rotatably supported in bearings 62 and 64 located in the bore of the tubular shifter shaft 18. Secured to the end 66 of the shaft which extends from the housing 16 is a lever 68, which is clamped on the shaft by a bolt 69. A yoke 70 connected to the end of lever 68 is secured to a rod 71 which extends upwardly to the selector lever (not shown) which is actuated by the lever located adjacent to the driver's seat in the vehicle.

At the inner end of the selector shaft 60 a lever 72 is clamped on the shaft by bolt 74. The bent end 76 of a rod 78 extends through an opening in the outer end of the lever 72, and the opposite end 80 extends through an opening in an arm 82 of a bell crank 84 which is pivotally connected by a bolt 86 to the central housing 16. An arm 88 at the opposite end of the bell crank terminates in a circular shaped end 90 which extends into a slot 92 formed in the underside of the shift and selector inner lever 38.

The shifter rod 49 is held in its intermediate position by a ball 94 which is pressed by spring 96 into engagement with a slot 98 formed in the rod, there being other slots 100 and 102 into which the ball is adapted to be pressed to hold the yoke 48 in position wherein either the first or second speed gear train will be in driving engagement.

Figure 5:
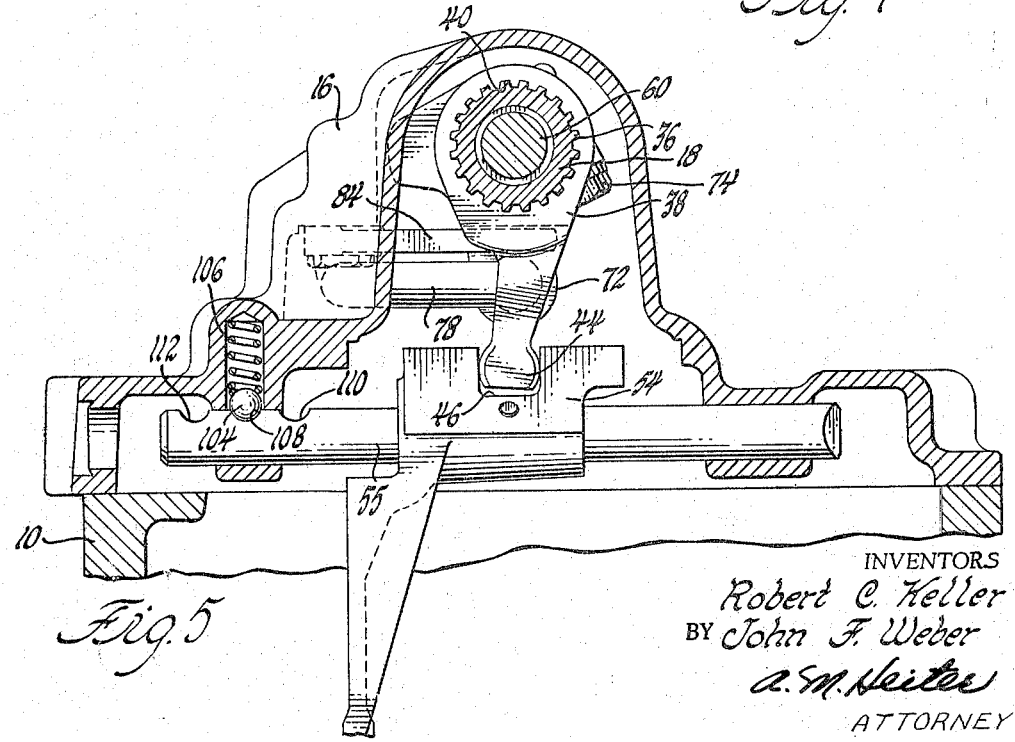
FIGURE 5 is a sectional view, taken on the line 5—5 of FIGURE 2.

As shown in FIGURE 5, the shifter rod 55 is held in its intermediate position by a ball 104 which is pressed by spring 106 into engagement with a slot 108 formed in the rod, the ball being adapted to be pressed into engagement with slots 100 or 112 to hold the yoke in position wherein either the third or fourth speed gear train will be in driving engagement.

Figure 6:
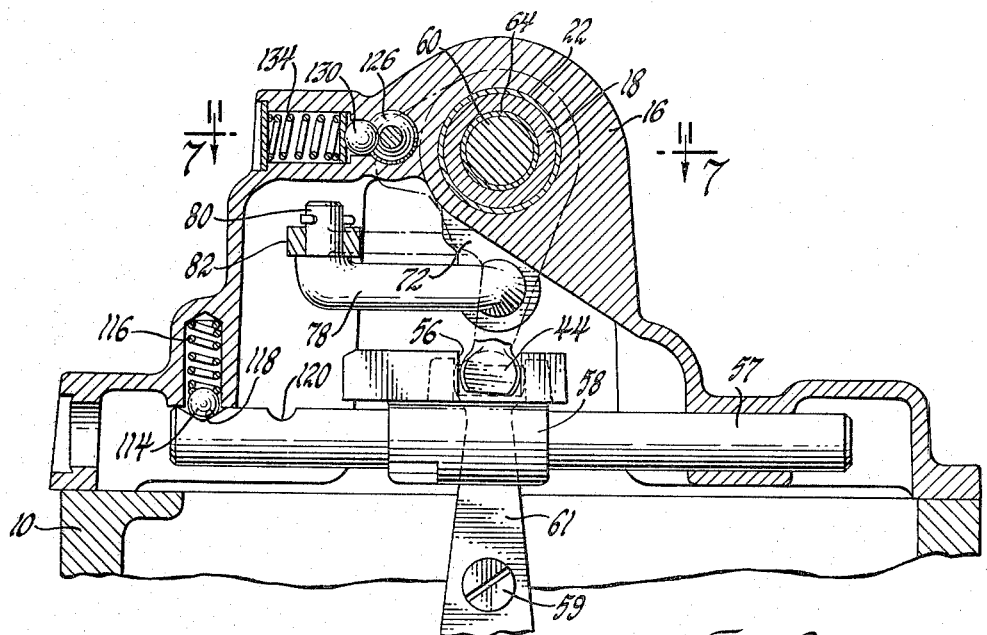
FIGURE 6 is a sectional view, taken on the line 6—6 of FIGURE 2.

As shown in FIGURE 6, the shifter rod 57 is held in the position it is shown in by a ball 114 which is pressed by spring 116 into engagement with a slot 118 formed in the rod. The ball 114 is adapted to be pressed into engagement with slot 120 when the rod is moved into position wherein the yoke 58 will hold the reverse gear train in driving engagement.

Figure 7:
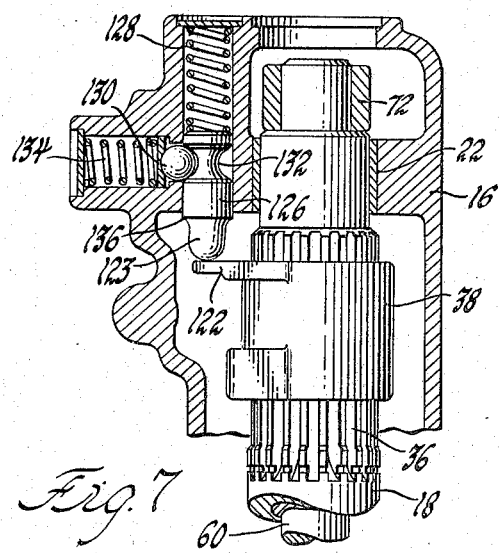
FIGURE 7 is a sectional view, taken on the line 7—7 of FIGURE 6.

To provide detent feel to indicate to the operator when the shift and selector inner lever 38 is moved from the first-second position, shown in FIG. 2 to the reverse position with end 44 of lever 38 in slot 56 of yoke 58, the mechanism best shown in FIGURE 7 is provided. Extending outwardly from the round portion of the lever 38 is a projection 122 which, as lever 38 moves from the first-second position to the reverse position, bears against the end 123 of the round detent member 126. A ball 130 is held by a spring 134 in a groove 132 formed in the detent member. It will be understood that when the shift and selector inner lever is moved from the first-second position toward the reverse position, the detent member 126 will be moved inwardly in the bore in which it is mounted by the projection 122 bearing against it, causing the ball 130 to be moved out of engagement with the groove 132 against the pressure of spring 134, providing a high resistance to initial movement toward reverse position. In reverse position the ball 130 will be held in engagement with the cylindrical portion 136 providing no resistance to movement. On movement from reverse position, spring 128 will return member 126 only to the position shown where ball 130 engages groove 132. If it is desired to provide some detent action in reverse position, ball 130 may engage reduced portion 123 in reverse position.

The operation of the transmission shifting mechanism will now be described. Assuming that it is desired to shift the transmission into first speed position, the hand shift lever will be moved by the driver into position wherein the rod 71 will turn the selector shaft 60 into such position that the lever 72 acting through the rod 78 and the end 90 of the bell crank 84 will cause the shift and select inner lever 38 to be moved axially on the shifter shaft 18 until its lower end 44 is in engagement with the slot 46 in shifter yoke 48, which is the position it is shown in in FIGURE 2. Then, the shifter rod 32 is moved by the driver's action so the lever 28 will cause the tubular shifter shaft 18 to be rotated in the direction wherein it will cause the shift and select inner lever 38 to swing sidewise and thereby slide the selector yoke 48 on the rod 49 so that the gearing 50 will be moved into the position wherein the first speed gears will be in driving engagement. Opposite rotation of shifter shaft 18 and of shifter and selector lever 38 will provide second speed.

It will be obvious that when it is desired to shift the transmission into other speeds, the selector rod 71 will be moved by the hand shifting lever into position wherein the lower end 44 of the shift and selector inner lever 38 either into the slot 52 in the shifter yoke 54 or into the slot 56 in the shifter yoke 58, and acting through the mechanism described above will cause the lower end 44 of the shift and select inner lever 38 to swing in the proper direction to shift the gearing into position wherein either the third or fourth speed gear train, or the reverse gear train, as desired, will be in driving engagement.

Figure 3:
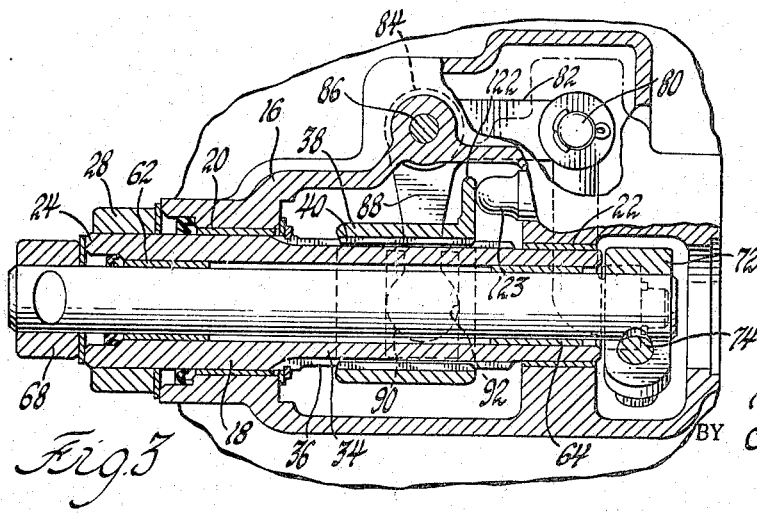
FIGURE 3 is a horizontal sectional view through the control mechanism, taken on the line 3—3 of FIGURE 2.
Figure 4:
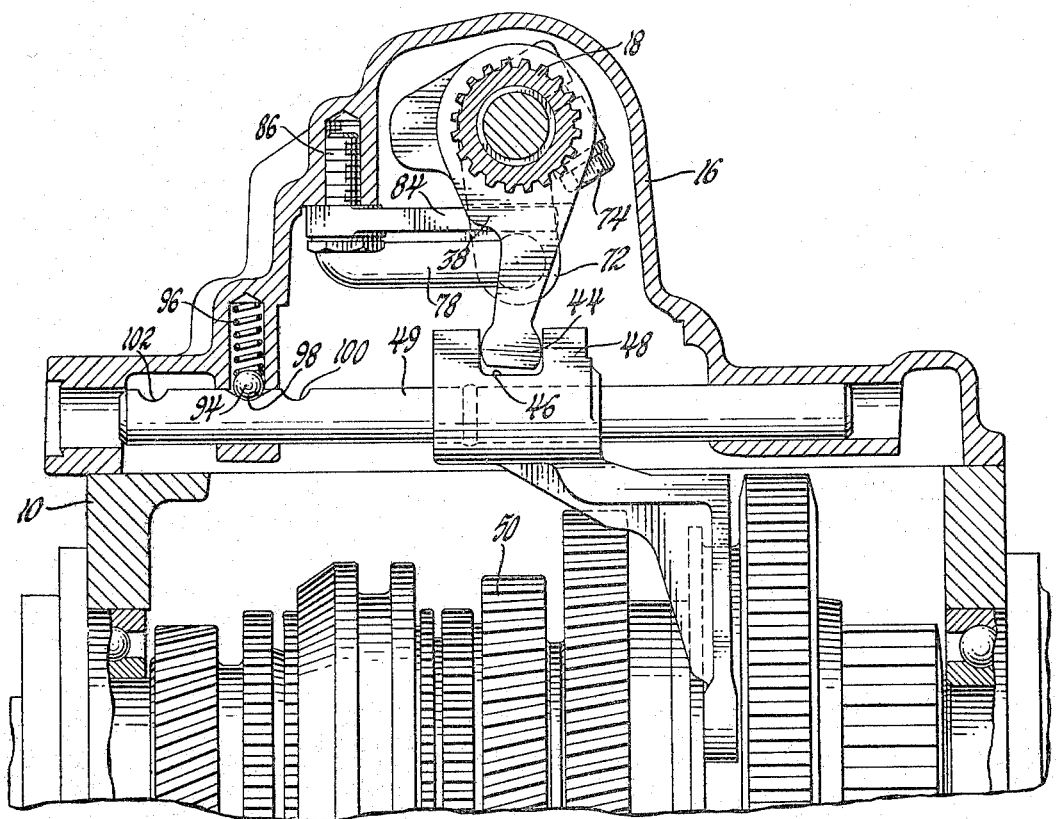
FIGURE 4 is a sectional view, taken on the line 4—4 of FIGURE 2.

It will be appreciated that this linkage may be made to provide the same response to rotation of the opposite hand of the selector shaft 60 by relocating bell crank 88 and rod 78 with the ends 92 and 76 in the same position and pivoting the bell crank 88 similarly on the opposite side of selector shaft 60, the lower side as viewed in FIG. 3.

It will be seen from the above description that by arranging the selector shaft 60 so that it is located inside of and concentric with the tubular shifter shaft 18, instead of being located above or below it as is usually done, and by arranging the selector linkage between the shift shaft and the shift rods, a very compact arrangement of minimum height is produced which makes it possible to lower the top of the transmission relative to the floor of the vehicle.

It will be understood that while we have shown and described a particular embodiment of our invention, various changes in the structure may be made without departing from the spirit and scope of the appended claims.

We claim:

1. In a selecting and shifting mechanism for a vehicle transmission change speed gearing including a transmission casing, a control housing mounted on said casing, a selector shaft adapted to control the selection of the desired speed gearing, and a shifter shaft adapted to control the shifting movement into the desired speed gearing, one of said shafts being tubular and being rotatably mounted in said control housing, the other of said shafts being rotatably mounted within the tubular shaft and selecting and shifting means movably mounted on said shafts for selecting movement in response to movement of the selector shaft and shifting movement in response to movement of the shifter shaft.

2. In a selecting and shifting mechanism for a vehicle transmission change speed gearing including a transmission casing, a control housing mounted on said casing, a selector shaft adapted to control the selection of the desired speed gearing, and a shifter shaft adapted to control the movement into the desired speed gearing, said shifter shaft being tubular and being rotatably mounted in said control housing, and said selector shaft being rotatably mounted within said shifter shaft.

3. In a selecting and shifting mechanism for a vehicle transmission change speed gearing including a transmission casing, a control housing mounted on said casing, a selector shaft adapted to control the selection of the desired speed gearing, a shifter shaft adapted to control the movement into the desired speed gearing, said shifter shaft being tubular and being rotatably mounted in said control housing, and a selector and shifter lever slidably mounted on said shifter shaft within said control housing, said lever being adapted to be moved axially on said shifter shaft to cause the selecting movement into the desired speed gearing.

4. In a selecting and shifting mechanism for a vehicle transmission change speed gearing including a transmission casing, a control housing mounted on said casing, a selector shaft adapted to control the selection of the desired speed gearing, a shifter shaft adapted to control the movement into the desired speed gearing, said shifter shaft being tubular and being rotatably mounted in said control housing and having splines formed on the exterior surface of its central portion, and a selector and shifter lever provided with a bore having splines formed therein, said lever being slidably mounted on said shifter shaft so that the splines in it register with the splines on the shifter shaft, said lever being adapted to be moved axially on said shifter shaft to cause the movement into the desired speed gearing.

5. In a selecting and shifting mechanism for a vehicle transmission change speed gearing including a transmission casing, a control housing mounted on said casing, a selector shaft adapted to control the selection of the desired speed gearing, a shifter shaft adapted to control the movement into the desired speed gearing, said shifter shaft being tubular and being rotatably mounted in said control housing and having splines formed on the exterior surface of its central portion, and a selector and shifter lever provided with a bore having splines formed therein, said lever being slidably mounted on said shifter shaft so that the splines in it register with the splines on the shifter shaft, said lever being adapted to be moved axially on said shifter shaft to cause the selection of the desired speed gearing and also being adapted to be rotated by said shifter shaft to cause the movement into the desired speed gearing.

6. In a selecting and shifting mechanism for a vehicle transmission including a transmission casing, a control housing mounted on said casing, a selector shaft adapted to control the selection of the desired speed gearing, a shifter shaft adapted to control the movement into the desired speed gearing, said shifter shaft being tubular and being rotatably mounted in said control housing, said selector shaft being rotatably mounted within said shifter shaft, a plurality of shifter rods mounted in said control housing, a separate shifter yoke slidably mounted on each of said shifter rods, a selector and shifter lever slidably mounted on said shifter shaft, and means associated with said selector shaft adapted when the latter is rotated to slide the shifter lever on said shifter shaft to cause the end of the shifter lever to be moved into engagement with one of the shifter yokes to select the desired speed gearing.

7. In a selecting and shifting mechanism for a vehicle transmission including a transmission casing, a control housing mounted on said casing, a selector shaft adapted to control the selection of the desired speed gearing, a shifter shaft adapted to control the movement into the desired speed gearing, said shifter shaft being tubular and being rotatably mounted in said control housing, said selector shaft being rotatably mounted within said shifter shaft, a plurality of shifter rods mounted in said control housing, a separate shifter yoke mounted on each of said shifter rods for sliding movement, a selector and shifter lever slidably mounted on said shifter shaft, a second lever mounted on the inner end of the selector shaft, and means connecting the second lever to the selector and shifter lever and serving to slide the latter on the shifter shaft when the selector shaft is rotated thereby serving to move the end of the selector and shifter lever into engagement with one of the shifter yokes to select the desired speed gearing.

8. The invention defined in claim 7 and said means connecting the second lever to the selector and shifter lever being a linkage located in the space between the shifter shaft and the shifter rods.

9. The invention defined in claim 7 and said means connecting the second lever to the selector and shifter lever including a bell crank lever pivoted to the control housing and having one end engaging a guide in the selector and shifter lever and linkage means connecting the selector shaft to the other end of said bell crank.

References Cited by the Examiner
UNITED STATES PATENTS

| | | | |
|---|---|---|---|
| 2,181,627 | 11/1939 | Peterson | 74—475 |
| 2,277,830 | 3/1942 | Phillips | 74—473 |
| 2,280,047 | 4/1942 | Nampa | 74—473 |
| 2,926,539 | 3/1960 | Leonard | 74—335 |

DAVID J. WILLIAMOWSKY, *Primary Examiner.*

H. S. LAYTON, *Assistant Examiner.*